(12) United States Patent
Werner et al.

(10) Patent No.: US 11,697,518 B2
(45) Date of Patent: Jul. 11, 2023

(54) DEVICE USED TO HANDLE ARTICLES TO BE PACKAGED AND METHOD USED TO ADAPT A DEVICE FOR THE TRANSPORT OF ARTICLES INTENDED FOR PACKAGING

(71) Applicant: Krones AG, Neutraubling (DE)

(72) Inventors: Juergen Werner, Brukmuhl (DE);
Herbert Spindler, Niedermoosen (DE);
Johann Luber, Bad Feilnbach (DE);
Stephan Wittmann, Neubeuern (DE)

(73) Assignee: Krones Ag, Neutraubling (DE)

( * ) Notice: Subject to any disclaimer, the term of this patent is extended or adjusted under 35 U.S.C. 154(b) by 92 days.

(21) Appl. No.: 17/070,978

(22) Filed: Oct. 15, 2020

(65) Prior Publication Data

US 2021/0114759 A1 Apr. 22, 2021

(30) Foreign Application Priority Data

Oct. 17, 2019 (DE) ..................... 10 2019 128 024.9

(51) Int. Cl.
| | |
|---|---|
| *B65B 43/08* | (2006.01) |
| *B65B 59/00* | (2006.01) |
| *B65B 43/52* | (2006.01) |
| *B65B 65/00* | (2006.01) |
| *B65G 41/00* | (2006.01) |

(52) U.S. Cl.
CPC ............ *B65B 59/003* (2019.05); *B65B 43/08* (2013.01); *B65B 43/52* (2013.01); *B65B 65/003* (2013.01); *B65G 41/002* (2013.01)

(58) Field of Classification Search
USPC ......................................................... 53/456
See application file for complete search history.

(56) References Cited

U.S. PATENT DOCUMENTS 3,986,319 A * 10/1976 Puskarz ................ B65B 11/004
53/228
9,637,314 B2    5/2017 Werner et al.
(Continued)

FOREIGN PATENT DOCUMENTS

DE         102016205255 A1    10/2017

OTHER PUBLICATIONS

Priority Application: DE 10 2019 128 024.9 filed Oct. 17, 2019—Extended European Search Report dated Mar. 3, 2021.

*Primary Examiner* — Chinyere J Rushing-Tucker
(74) *Attorney, Agent, or Firm* — Simmons Perrine Moyer Bergman PLC

(57) ABSTRACT

A device (1) handling articles comprises at least one work module (30), which can move packages with article placed on a first packaging type and at least one folding mechanism (45) used to erect back and/or front flaps of the first packaging type. Another component of the device (1) is at least one transport module (20), with a transport device (2), along which articles intended for packages of a second packaging type move, where the second packaging type differs from the first packaging type. The at least one folding mechanism (45) and the transport device (2) alternate between an operating position (BP) and a waiting position (WP). The operating positions (BP) and the waiting positions (WP) are configured such that the at least one folding mechanism (45) is disposed exclusively adjacent to the right side or to the left side of the transport means (2).

15 Claims, 6 Drawing Sheets

(56) References Cited

U.S. PATENT DOCUMENTS

2015/0367974 A1\* 12/2015 Sytema .................. B65B 43/10
　　　　　　　　　　　　　　　　　　　53/461
2016/0207658 A1\* 7/2016 Bellante ................. B65B 43/26
2018/0251251 A1 9/2018 Wittmann et al.
2018/0251315 A1 9/2018 Wittmann et al.

\* cited by examiner

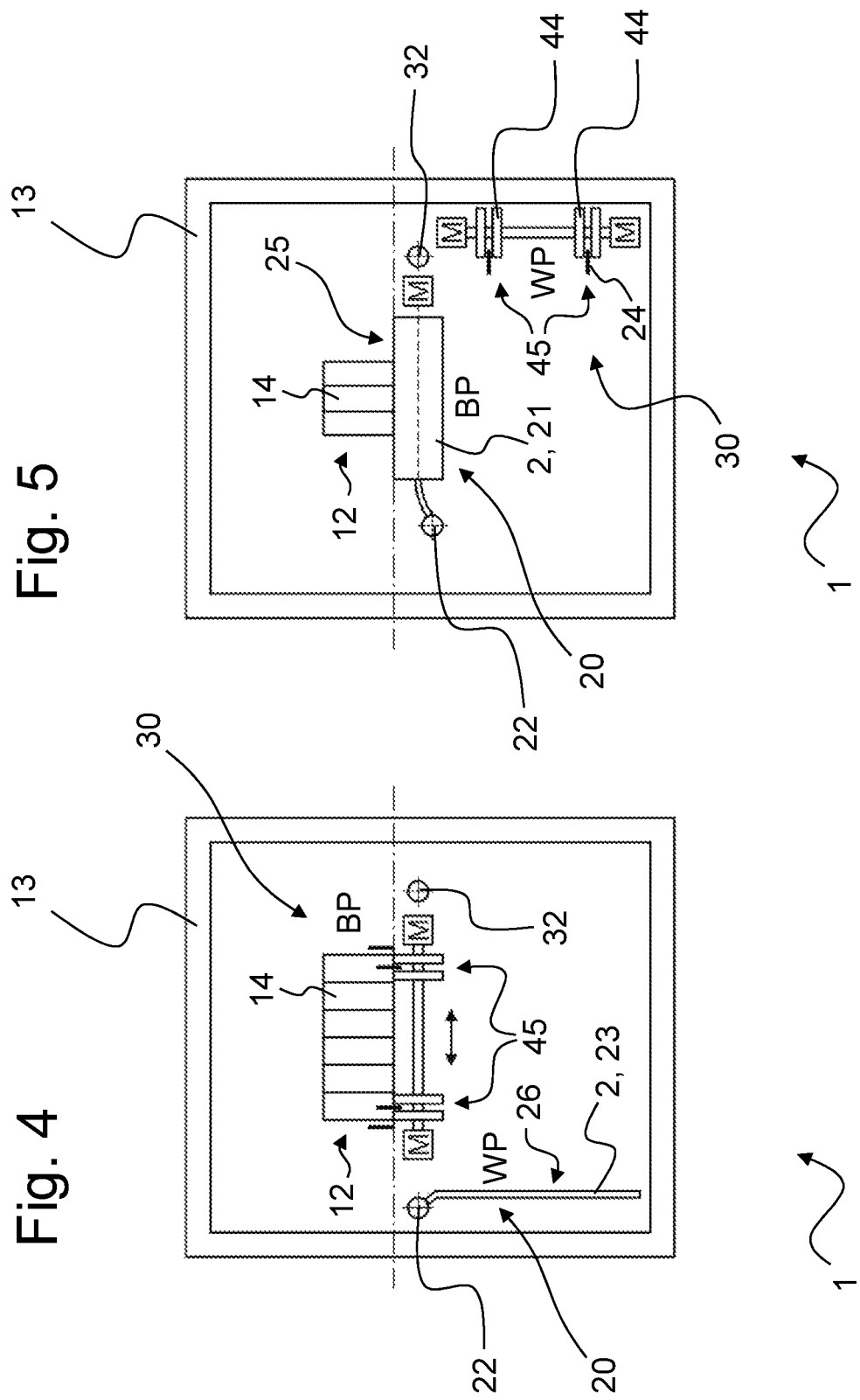

DEVICE USED TO HANDLE ARTICLES TO BE PACKAGED AND METHOD USED TO ADAPT A DEVICE FOR THE TRANSPORT OF ARTICLES INTENDED FOR PACKAGING

CLAIM OF PRIORITY

The present application claims priority to German Application DE 10 2019 128 024.9, filed Oct. 17, 2019, which is incorporated by reference.

FIELD OF THE INVENTION

The present invention relates to a device used to handle articles to be packaged and a method used to adapt a device for the transport of articles intended for packaging.

BACKGROUND OF THE INVENTION

There is a wide variety of packaging alternatives for processing, assembling, grouping, and packaging articles, such as beverage containers. PET containers are currently the most commonly used type of containers, for instance for beverages, but they are relatively thin-walled and, even when filled, not completely dimensionally stable. For this reason and for the purpose of improved logistic handling, a wide variety of different packages are used for processing and/or packaging grouped individual containers. It is possible to place the containers in a grouped arrangement onto a cardboard blank, for example, the rims of which are folded upward. In practice, such cardboard blanks are referred to as so-called trays.

It is also possible to use cardboard blanks corresponding in size to at least the base size of a bundle arrangement, with the individual containers or beverage containers that form a part of a particular bundle standing on the blanks. Such cardboard blanks have no rims to fold upward; instead they remain flat even in the completed bundle. In practice, such cardboard blanks are referred to as pads.

In order to obtain a stable bundle assembly that can be easily transported and stacked, such bundle arrangements can optionally be subsequently wrapped in thermoplastic film, which is then applied by a heat shrinking process onto the beverage containers that form a part of a particular bundle. A further bundle variant is referred to as "shrink-only packaging", because the assembled containers are wrapped in thermoplastic film and the thermoplastic film is subsequently shrunk onto the particular assembled containers without using any packaging material or any cardboard blanks besides the thermoplastic film.

In such a bundle variant, the dimensional stability of the package is ensured solely by the shrinking foil. Currently known packaging machines and their conveying devices are normally specifically adapted to a certain type, size, and/or shape of conveyed goods. Different types of bundles or different packaging alternatives moreover require the use of different, specific conveying devices. A product change can in some circumstances make the further use of certain conveying devices impossible if these devices are not suitable for transporting the specific, currently required type of individual articles or containers, for example. Disturbances in the article transporting process can also occur if the packaging machines are specifically adjusted to transporting a different product variant. Conveying problems such as these may particularly arise when there are changes between packed goods, such as bundle units, and loose goods, such as individual beverage containers or the like. Articles, such as beverage containers, that are to be conveyed in a standing position are prone to tipping over and/or falling down if conveying devices are used that are adapted for transporting bundle units, especially if the transport modules are not equipped with support surfaces that are sufficiently flat and level to safely transport objects with a very small base size.

Devices are already known from prior art that serve to prevent such problems by offering a plurality of modules that can be exchangeable or that can be selectively introduced into a specific section of a transport path. Such a device is disclosed in WO 2012/062549 A1, for example. The device described in the document relates to a machine for the processing and/or packaging of objects, the machine having a substantially horizontal transport path used to convey articles, bundles and/or packaging units. The machine comprises a first horizontal conveying device with at least one transport device with a first operating mode, which first horizontal conveying device can be replaced by another, further horizontal conveying device with at least one second transport device that is different from the first transport device so as to establish at least one further operating mode. The further horizontal conveying device is suspended above the first horizontal conveying device. If the further horizontal conveying device is intended to be used instead of the first horizontal conveying device, the further horizontal conveying device needs to be lowered with the help of a crane and placed into a transport path provided for articles. The placing and the necessarily involved lowering of the further horizontal conveying device into the transport path in such a manner requires a complex structure of the device and is frequently associated with a greater input of time.

One object of the invention can therefore be seen in providing a device that is suited for different packaging types and that can be easily adapted to a particular packaging type intended for a certain specific type of articles to be packaged. The device should furthermore have a simple structure. Another object of the invention can be seen in providing a corresponding method to easily adapt or modify such a device to suit a particular packaging type intended for a certain specific type of articles to be packed. In addition, the method should be easy to implement.

The above objects are fulfilled by a device and a method according to the present invention.

SUMMARY OF THE INVENTION

The invention relates to a device used to handle articles to be packaged. The articles can be formed by beverage containers, for example. The beverage containers can be beverage bottles or PET bottles and/or beverage cans and/or other types of beverage containers.

The device comprises at least one work module, which can move packages of a first packaging type with articles placed on it, and which has at least one folding mechanism used to erect back and/or front flaps, which back and/or front flaps are formed by the packages of the first packaging type.

The packages of the first packaging type can thus be formed by flat packaging blanks with back and/or front flaps, which can be erected or transferred into an upright orientation via the at least one folding mechanism of the at least one work module. Such packages as can be formed by packages of the first packaging type are in practice also referred to as trays. Packages of the first packaging type can also be formed by outer packages, which in addition to the back and/or front flaps each have at least one top flap or lid which can be folded in, hereby closing the particular outer package.

The folding in of the top flap or lid can be carried out by a closing mechanism as described below in more detail.

The device moreover comprises at least one transport module, which comprises a transport device, along which transport device articles intended for packages of a second packaging type are movable, which second packaging type differs from the first packaging type.

Packages of the second packaging type can be formed by flat packaging blanks without flaps to fold in. Packages of the second packaging type can thus have two broadside surfaces, with one broadside surface forming a support surface for a plurality of articles or a plurality of beverage containers. Packages of the second packaging type can thus be formed by so-called pads. Packages of the second packaging type can also be formed by thermoplastic packaging material and/or by strappings, for example. It is thus conceivable that articles are movable via the transport device of the at least one transport module without the articles in the process standing on a flat packaging blank. A thermoplastic packaging blank can subsequently be applied onto the articles that are already being moved via the transport device. It is also possible that articles are movable via the transport device of the at least one transport module that stand one a package of the second packaging type designed as pad, which has no flaps that could be or would have to be folded in.

Embodiments have proved successful, in which the device has a frame structure, which frame structure at least partly and preferably completely bears a mass of the at least one folding mechanism and/or a mass of the transport device. In this context it is possible that the at least one folding mechanism and/or the transport device are mechanically coupled to the frame structure.

It is provided that the at least one folding mechanism of the at least one work module and the transport device of at least one transport module are movable back and forth, alternating between a particular operating position and a particular waiting position, such that either the at least one folding mechanism of the at least one work module or the transport device of the at least one transport module is located in its particular operating position.

The operating positions and the waiting positions are configured in such a manner that the at least one folding mechanism of the at least one work module is disposed exclusively adjacent to the right side or to the left side of the transport device of the at least one transport module. Articles can be moved along a horizontal transport direction, as required in each instance, by the device or by of the transport device that has been brought into its operating position or of the at least one folding mechanism that has been brought into its operating position. The operating positions and the waiting positions can thus be configured in such a manner that the at least one folding mechanism of the at least one work module is disposed exclusively adjacent to the right side or to the left side, with regard to the horizontal transport direction, of the transport device of the at least one transport module. If the transport device has been brought into its operating position, the at least one folding mechanism of the at least one work module can thus be disposed exclusively adjacent to the right side or to the left side of the transport device. If the transport device has been brought into its waiting position, the at least one folding mechanism can thus continue to be disposed exclusively adjacent to the right side or to the left side of the transport device.

Since the at least one folding mechanism is disposed on merely one side or rather adjacent to the right side or to the left side of the transport device, the at least one folding mechanism can therefore also be easily maintained or repaired, provided the transport device is in its operating position.

It is possible for the transport device to provide a support surface, along which support surface articles intended for packages of the second packaging type can be slidingly moved. The support surface and the operating position of the transport device can be designed in such a manner that the support surface has a horizontal orientation if the transport device is in its operating position or if the transport device has been transferred into its operating position. The device can moreover comprise a plurality of pusher bars, which come into surface contact with articles and can push the particular articles along the support surface if the transport device is in its operating position or if the transport device has been transferred into its operating position. It has proved successful for the device to comprise a chain drive and/or belt drive, on which a plurality of pusher bars are disposed, which come into surface contact with articles and can push the particular articles under surface contact along the support surface in a sliding manner if the transport device is in its operating position or if the transport device has been transferred into its operating position.

It is conceivable that the pusher bars are disposed on the chains or belts of a chain drive and/or belt drive in a detachable manner for an operating mode in which they are not required or for a conversion to another operating mode. The chain drive and/or belt drive (including pusher bars) can alternatively be adjusted in analogy to EP 3 372 513 B1 by a further drive or by hand to a passive position, for example upward (that is, away from the earth's center).

Furthermore, the transport device can be designed as circulatingly driven component of a horizontal conveying system of the at least one transport module. It is thus possible that the transport device is designed as conveyor belt of a horizontal conveying system of the at least one transport module. The transport device can thus be designed as endlessly circulating conveyor strand of a horizontal conveying system of the at least one transport module.

It is conceivable that the transport device of the at least one transport module is connected to preferably formed by a joint mechanism comprising an axis of rotation, via which the transport device is swivelable from its operating position into its waiting position and from its waiting position into its operating position. It is possible that the device comprises at least one actuator, which can swivel the transport device from its operating position into its waiting position and from its waiting position into its operating position. The at least one actuator can be in communication with a control device and/or regulating device, via which a user can in each instance specify or in each instance induce a particular swiveling of the transport device from its operating position into its waiting position and from its waiting position into its operating position.

Alternatively or additionally, it is possible that the at least one folding mechanism is connected to preferably formed by a joint mechanism comprising an axis of rotation, via which the at least one folding mechanism is swivelable from its operating position into its waiting position and from its waiting position into its operating position. It is possible that the device comprises at least one actuator, which can swivel the at least one folding mechanism from its operating position into its waiting position and from its waiting position into its operating position. The at least one actuator can be in communication with a control device and/or regulating device, via which a user can in each instance specify or in each instance induce a particular swiveling of the folding mechanism from its operating position into its waiting position and from its waiting position into its operating position.

Embodiments have proved successful, in which the device comprises a control device and/or regulating device as well as at least one actuator, which is in communication with the control device and/or regulating device. The control device and/or regulating device can be designed in such a manner that the control device and/or regulating device can independently cause the alternating movement for the at least one folding mechanism and for the transport device via the at least one actuator.

Embodiments have proved successful, in which the transport device of the at least one transport module is connected to a joint mechanism comprising an axis of rotation, via which the transport device is swivelable from its operating position into its waiting position and from its waiting position into its operating position. It is additionally possible that the at least one folding mechanism is connected to another joint mechanism comprising another axis of rotation, via which the at least one folding mechanism is swivelable from its operating position into its waiting position and from its waiting position into its operating position. It is possible in this context that the first axis of rotation preferably formed by a joint mechanism and the other axis of rotation preferably formed by a joint mechanism are disposed spaced apart from each other.

The first axis of rotation preferably formed by a joint mechanism and the other axis of rotation preferably formed by a joint mechanism can also run parallel to each other. In this context it is possible that the first axis of rotation preferably formed by a joint mechanism and the other axis of rotation preferably formed by a joint mechanism run parallel to each other and parallel to the previously already mentioned transport direction provided for articles.

It is also possible that the at least one work module comprises a linear guide, via which linear guide the at least one folding mechanism is movable in horizontal direction from its operating position into its waiting position and from its waiting position into its operating position. The at least one folding mechanism can be fastened to the previously already mentioned frame structure via the linear guide. Furthermore, the at least one transport module can comprise a linear guide, via which linear guide the transport device is movable in horizontal direction from its operating position into its waiting position and from its waiting position into its operating position. The transport device can also be fastened to the previously already mentioned frame structure via the linear guide.

Furthermore, the transport device of the at least one transport module can be mechanically coupled to the at least one folding mechanism of the at least one work module such that the transport device of the at least one transport module is in each instance moved along together with the at least one folding mechanism in a movement of the at least one folding mechanism from its operating position into its waiting position and from its waiting position into its operating position. In this context, it is conceivable that the transport device is mechanically coupled to the at least one folding mechanism of the at least one work module via the already described axis of rotation or via the first axis of rotation, which is preferably formed by a joint mechanism. The mechanical coupling can be formed in such a manner that the at least one folding mechanism, in a movement from its operating position into its waiting position, pulls the transport device into its operating position and in the process swivels the transport device.

The device can comprise at least one closing mechanism used to fold or fold in top flaps which top flaps are formed by the packages of the first packaging type. It is possible that the at least one closing mechanism is movable back and forth, alternating between an operating position and a waiting position, such that the at least one closing mechanism and the at least one folding mechanism can assume their particular operating position together and their particular waiting position together. It is moreover possible that the operating positions and the waiting positions of the at least one folding mechanism and of the transport device are configured in such a manner that the at least one closing mechanism is disposed exclusively above the at least one folding mechanism and exclusively above the transport device. It has proved successful for the at least one closing mechanism to be able to alternatingly switch between its operating position and its waiting position by a particular movement in vertical direction.

The invention furthermore relates to a method used to adapt a device for the transport of articles intended for packaging to a particular packaging type intended for the articles. Features that have already been described above regarding various embodiments of the device can likewise be provided for various embodiments of the method described below, and they are not repeatedly mentioned herein. Features that are described regarding various embodiments of the method as follows can likewise be provided for various embodiments of the device as already described above.

At least one work module is provided for the method, which work module can move packages of a first packaging type with articles placed into it, and which has at least one folding mechanism used to erect back and/or front flaps, which back and/or front flaps are formed by the packages of the first packaging type. At least one transport module is moreover provided for the method, which transport module comprises a transport device, along which transport device articles intended for packages of a second packaging type are movable, which second packaging type differs from the first packaging type.

In the context of the method, the at least one folding mechanism and the transport device are moved back and forth, alternating between a particular operating position and a particular waiting position, such that either the at least one folding mechanism of the at least one work module or the transport device of the at least one transport module is located each in its particular operating position.

It is provided that the alternating movement between the particular operating position and the particular waiting position is carried out such that, temporally during and after a completion of an alternating movement, the at least one folding mechanism is disposed exclusively adjacent to the right side or to the left side in relation to the transport device of the at least one transport module.

It is possible that the transport device is circulatingly driven in the operating position and in this context moves articles intended for packages of a second packaging type, and/or that articles intended for packages of a second packaging type are slidingly moved via the transport device in the operating position. The transport device can thus be designed as conveyor strand of a horizontal conveying system of the transport module. It is also possible that the transport device provided for the method provides a support surface along which support surface articles intended for packages of the second packaging type can be slidingly moved if the transport device is in its operating position or temporally after the transport device has been transferred from its waiting position into its operating position.

It is conceivable that the transport device of the at least one transport module is swiveled into its operating position via an axis of rotation preferably formed by a joint mechanism and is swiveled back from its operating position into its waiting position via the axis of rotation preferably formed by a joint mechanism. Alternatively or additionally, it is possible that the at least one folding mechanism is swiveled into its operating position via an axis of rotation preferably formed by a joint mechanism and is swiveled back from its operating position into its waiting position via the axis of rotation preferably formed by a joint mechanism.

It is conceivable that the transport device of the at least one transport module is swiveled into its operating position actuatorically (e.g. with an actuator) via an axis of rotation preferably formed by a joint mechanism and is swiveled back from its operating position into its waiting position actuatorically via the axis of rotation preferably formed by a joint mechanism. Alternatively or additionally, it is possible that the at least one folding mechanism is swiveled into its operating position actuatorically via an axis of rotation preferably formed by a joint mechanism and is swiveled back from its operating position into its waiting position actuatorically via the axis of rotation preferably formed by a joint mechanism.

It has proved successful for the at least one transport module to be swiveled into its operating position via a first axis of rotation preferably formed by a joint mechanism and to be swiveled back from its operating position into its waiting position via the first axis of rotation preferably formed by a joint mechanism. In addition, the at least one folding mechanism can be swiveled from its waiting position into its operating position via another axis of rotation preferably formed by a joint mechanism and can be swiveled back from its operating position into its waiting position via the other axis of rotation preferably formed by a joint mechanism. The first axis of rotation preferably formed by a joint mechanism and the other axis of rotation preferably formed by a joint mechanism can be disposed spaced apart from each other. It has proved successful for the first axis of rotation preferably formed by a joint mechanism and the other axis of rotation preferably formed by a joint mechanism to run parallel to each other.

The at least one folding mechanism can be moreover moved via a linear guide in horizontal direction from its operating position into its waiting position and from its waiting position into its operating position in the context of the alternating back and forth movement.

At least one closing mechanism that is used to fold top flaps can be provided for the method, with the top flaps being formed by the packages of the first packaging type. In this instance it is possible that the at least one closing mechanism is moved back and forth, alternating between an operating position and a waiting position, such that the at least one closing mechanism and the at least one folding mechanism assume their particular waiting position simultaneously. In this context, the alternating movement for the at least one closing mechanism can then be carried out in such a manner that, temporally during and after a completion of an alternating movement, the at least one closing mechanism is located exclusively above the transport device and exclusively above the at least one folding mechanism.

BRIEF DESCRIPTION OF THE FIGURES

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 2 to 4 show schematic cross-sectional views of a first embodiment of a device according to the invention and illustrate individual steps such as can be provided in various embodiments of the method according to the invention;

FIG. 5 shows a schematic cross-sectional view of a second embodiment of a device according to the invention and illustrates individual steps such as can be provided in various embodiments of the method according to the invention;

Figure 1:
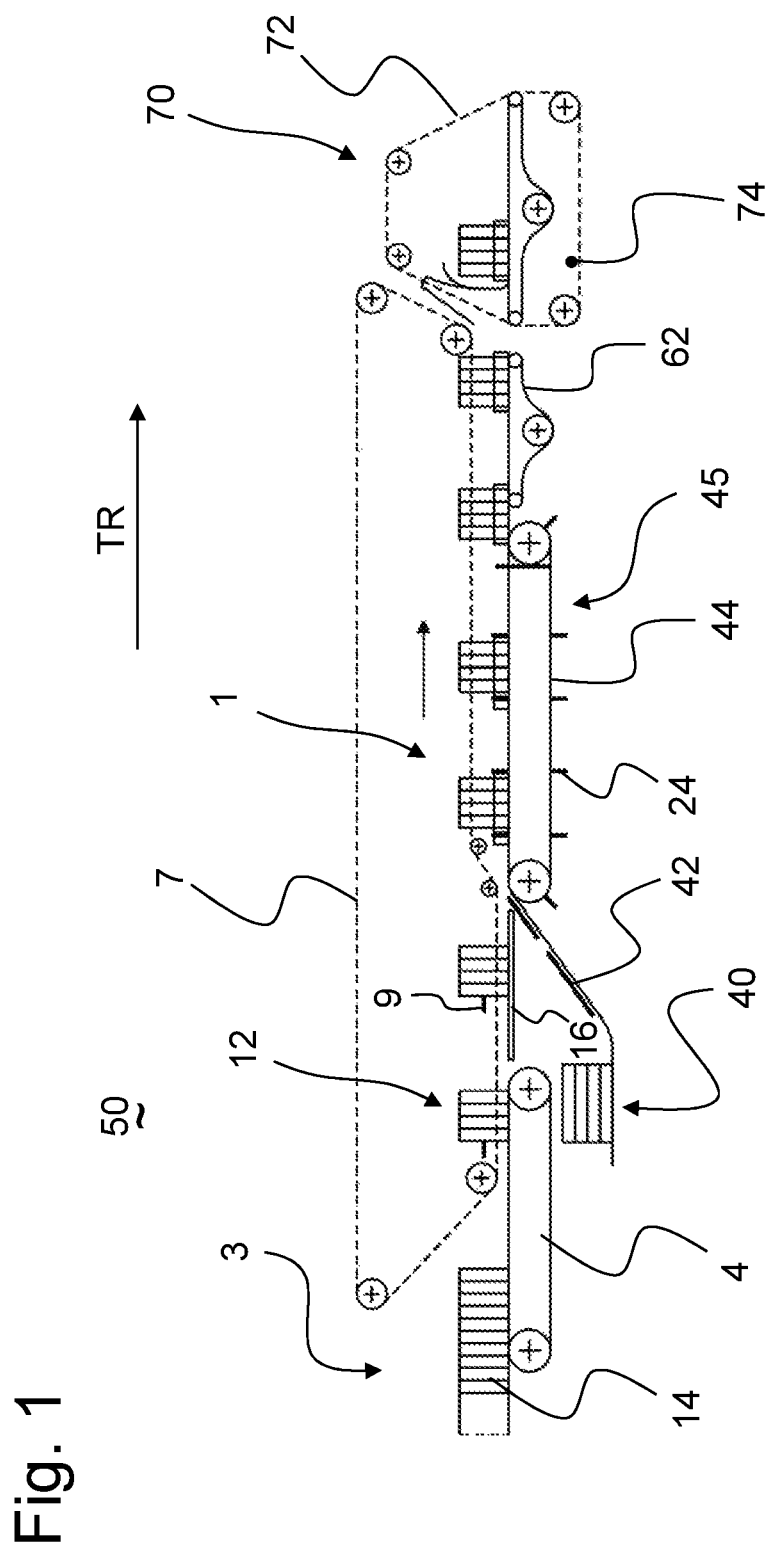
FIG. 1 shows a schematic view of a packaging facility 50, in which the embodiments of the devices 1 illustrated in the subsequent FIGS. 2 to 7 can be used or in which the steps of the method 100 according to the embodiment pursuant to FIG. 8 can be performed.

The same or equivalent elements of the invention are designated using identical reference characters. Furthermore and for the sake of clarity, only the reference characters relevant for describing the individual figures are provided. It should be understood that the detailed description and specific examples, while indicating preferred embodiments, are intended for purposes of illustration only and are not intended to limit the scope of the invention.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

If illustrations and aspects are generally referred to as being "schematic" in the context of the figures, this is by no means intended to imply that the illustration of the figures and their description are of inferior significance with regard to the disclosure of the invention. The person skilled in the art is fully capable of gathering sufficient information from the schematically and abstractly drawn illustrations for facilitating the understanding of the invention without the understanding being in any way impaired by, for example, the size ratios being drawn and being potentially not precisely true to scale. On the basis of the more concretely explained realizations of the method according to the invention and on the basis of the more concretely explained functionality of the device according to the invention in the figures, the person skilled in the art as a reader is thus enabled to derive a better understanding of the inventive idea, which is formulated in a more general and/or more abstract manner in the claims and in the general part of the description.

DETAILED DESCRIPTION OF THE INVENTION

Figure 7A:
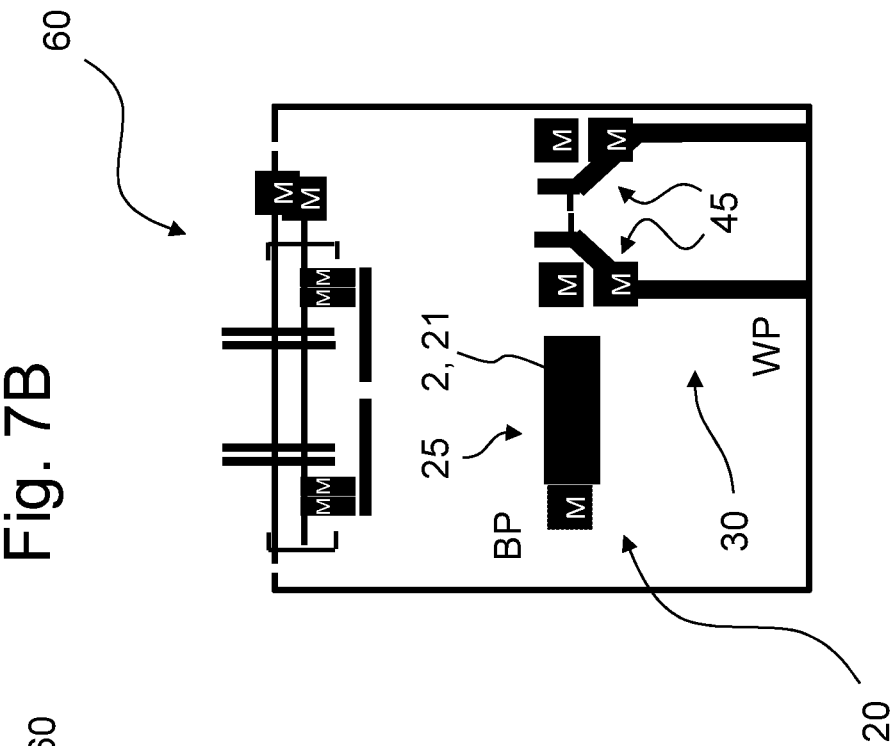
FIGS. 7a and 7b show a schematic cross-sectional view of a fourth embodiment of a device according to the invention and illustrate individual steps such as can be provided in various embodiments of the method according to the invention.
Figure 7B:
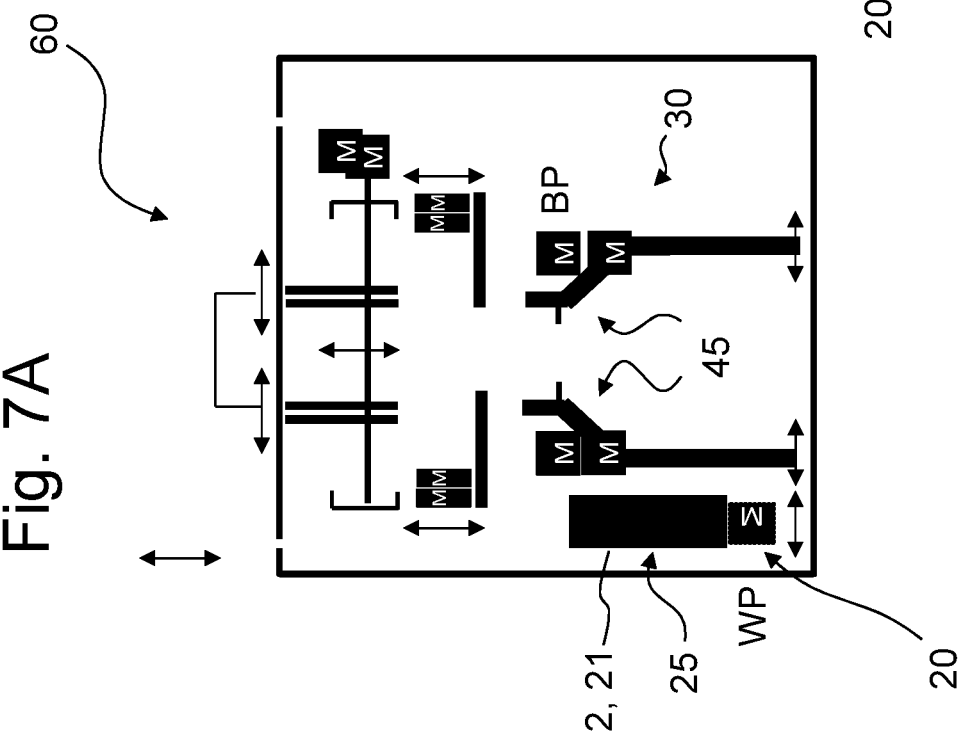
Figure 8:
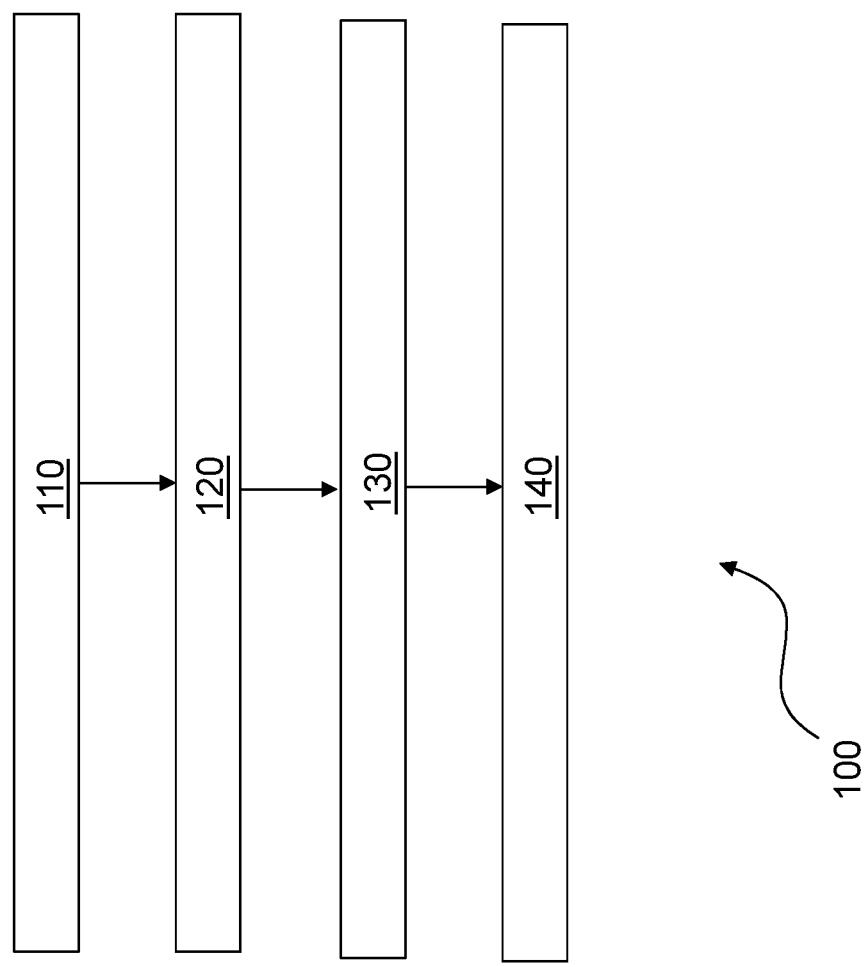
FIG. 8 shows a flowchart of steps such as can be provided individually or in the combination or sequence illustrated according to FIG. 8 in various embodiments of the method according to the invention.

FIG. 1 shows a schematic view of a packaging facility 50, in which the embodiments of the devices 1 illustrated in the subsequent FIGS. 2 to 7 can be used or in which the steps of the method 100 according to the embodiment pursuant to FIG. 8 can be performed.

The packaging facility 50 comprises an infeed 3 with a transport belt 4, on which a multitude of beverage containers 14, which are merely schematically illustrated in FIG. 1, are being moved one after another in transport direction TR. The beverage containers 14 can be beverage bottles or PET beverage bottles and/or beverage cans, for example.

A plurality of pusher bars 9 are disposed on a chain drive and/or belt drive 7, with the pusher bars 9 being circulatingly moved via the chain drive and/or belt drive 7. In order to package a plurality of beverage containers 14 together, a particular pusher bar 9 comes into surface contact from the back with at least one beverage container 14, accelerates this at least one beverage container 14 in relation to a transport speed of the transport belt 4, and hereby pushes this at least one beverage container 14 together with further, preceding beverage containers 14 onto the transfer plate 16. Hereby, sets 12 of beverage containers 14 are pushed in a sliding manner along the transfer plate 16 by the particular pushing bar 9, which sets 12 of beverage containers 14 are at a later point in time packaged together or connected to each other in a bundle comprising a plurality of beverage containers 14.

It is moreover discernible from FIG. 1 that a supply 40 of flat packaging blanks 42 is located below a transport level provided for the beverage containers 14. The flat packaging blanks 42 are disposed in the supply 40 in a stacked manner. The flat packaging blanks 42 are moreover so-called trays having lateral, front, and back flaps, which can be folded in an upward direction, and which, in a particular upward-folded orientation, form an outer package for a particular set 12 of beverage containers 14. Folding the flaps is caused by a device as is illustrated in FIG. 1 with the reference number 1, which device 1 can be designed according to an exemplary embodiment of the subsequent FIGS. 2 to 7, for example.

FIG. 1 shows that the flat packaging blanks 42 are taken from the supply 40 and are following hereafter fed into a transport path of the beverage containers 14 through a gap formed between the transfer plate 16 and the device 1. In the area of the gap, a particular set 12 of beverage containers 14 passes onto a particular flat packaging blank 42 such that a particular set 12 of beverage containers 14 in the area of the device 1 is located on a particular flat packaging blank 42.

In order to erect the previously mentioned flaps of the flat packaging blank 42, the device 1 comprises a folding mechanism 45. The folding mechanism 45 has two chain drives and/or belt drives 44 running parallel to each other, of which one chain drive and/or belt drive 44 is discernible in FIG. 1. Another chain drive and/or belt drive 44 is disposed behind the chain drive and/or belt drive 44 in relation to a direction toward the image plane. A plurality of folding fingers 24 are circulatingly moved via each chain drive and/or belt drive 44. In this way, the chain drives and/or belt drives 44 receive a particular flat packaging blank 42 with the set 12 of beverage containers 14 passed thereonto, move the particular flat packaging blank 42 in transport direction TR, and erect the flaps of the particular flat packaging blank 42 via the folding fingers 24. Prior to that, a bonding layer and/or adhesive layer can be applied onto the particular flaps of a packaging blank 42 such that the flaps are glued to each other and remain in their upright orientation after being erected. The particular bonding layer and/or adhesive layer can harden at least partly during the continuing movement in transport direction TR by device 1.

The device 1 is followed in transport direction TR by an outfeed belt 62, which receives the packaging blanks 42, with the flaps continuing upright, from the device 1 and moves the packaging blanks 42 toward a wrapping module 70. The wrapping module 70 also has a circulating chain drive and/or belt drive 72. Disposed on the chain drive and/or belt drive 72 of the wrapping module 70 are a plurality of wrapping rods 74, which apply blanks of thermoplastic packaging material onto the sets 12 of beverage containers 14. Together with the blanks of thermoplastic packaging material as well as together with the flat packaging blanks 42 or with the particular tray on which the sets 12 of beverage containers 14 continue to stand, the sets 12 of beverage containers 14 are then fed to a shrink tunnel, which is not illustrated in the figures of the present patent application, and in which the blanks of thermoplastic packaging material are shrunk onto the sets 12 of beverage containers 14. If it is not intended to shrink thermoplastic packaging material onto the sets 12 of beverage containers 14, the wrapping module 70 can be dispensed with, which means that the wrapping module 70 is an optional component of the packaging facility 50.

If the sets 12 of beverage containers 14 are intended to be provided with packages of a second packaging type, which packages of the second packaging type have no flaps that should or must be folded in an upward direction, the chain drives and/or belt drives 44 of the device 1 are not suitable for moving the particular sets 12 of beverage containers 14 further along a transport path formed between the further transport belt 62 and the transfer plate 16. In practice, the chain drives and/or belt drives 44 are up to now moved apart, whereby the relative distance between the chain drives and/or belt drives 44 is increased. In a free space hereby resulting between the chain drives and/or belt drives 44, a horizontal conveying system or another transport device can then be put to use instead of the chain drives and/or belt drives 44 to move the particular sets 12 of beverage containers 14 intended for the particular package of a second or of another packaging type further along in transport direction TR. For this purpose, the horizontal conveying system is frequently suspended above a transport level for articles and then lowered with the help of a gantry crane or placed into the free space formed between adjacent chain drives and/or belt drives 44 with the help of a gantry crane. It has become obvious that such an adaptation of the device 1 is associated with a high input of time and that such an adaptation of the device 1 requires a complex structure. For the device 1 it is therefore provided that the folding mechanism 45 is disposed exclusively on the right side or on the left side in relation to the transport device, which is not included in FIG. 1. As already mentioned and as explained in each instance below in the following FIGS. 2 to 7, the transport device can be designed, for example, as horizontal conveying system 25 or as circulating conveyor strand 21 of a horizontal conveying system 25 (cf. FIG. 5). An arrangement in which the folding mechanism 45 is located exclusively on the right side or on the left side of the transport device, as illustrated in the following figures with the reference number 2, is moreover suitable for keeping the folding mechanism 45 accessible for a maintenance or repair.

It should be mentioned that various bundles or multipacks do not have any flat packaging blanks formed by a tray or pad, on which packaging blanks the particular beverage containers would stand. In such bundles or multipacks the beverage containers 14 can be gathered together, for example, exclusively by a strapping or exclusively by thermoplastic packaging material. If the beverage containers are intended to be moved along a transfer path formed in the area of the device 1 in order to be packaged, the chain drives and/or belt drives 44 illustrated in FIG. 1 are also not suitable for transporting beverage containers 14 or sets 12 of beverage containers 14. In order to enable a transport for such beverage containers 14, and according to the description for the following FIGS. 2 to 7, a transport means 2 is for this purpose in each instance also placed into the transport path of the beverage containers 14 instead of the chain drives and/or belt drives 44 or instead of the folding mechanism 45 which transport device 2 can be formed by a horizontal conveying system 25 or also by a panel 23, for example. In this instance, the folding mechanism 45 continues to be disposed exclusively on the right side or on the left side in relation to the transport device 2.

Figure 3:
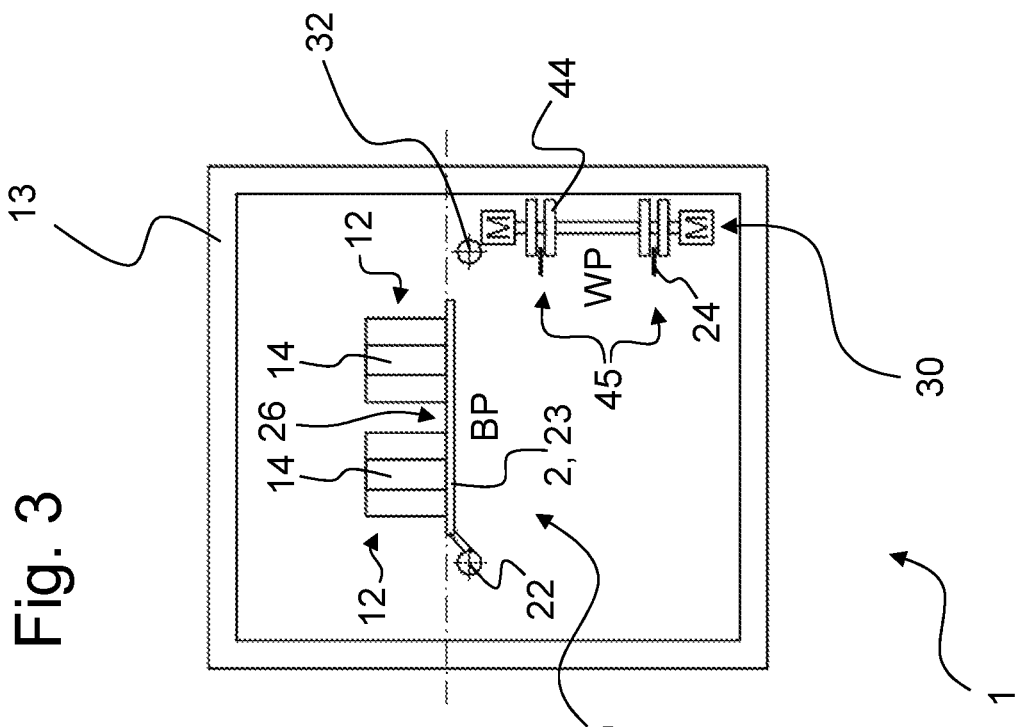
Figure 2:
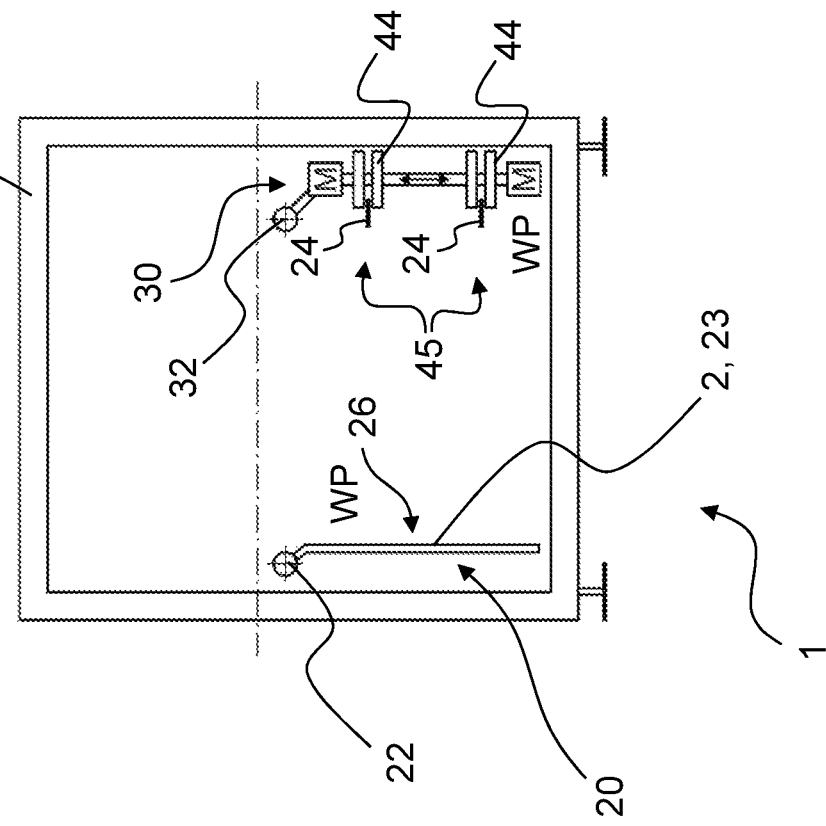

FIGS. 2 to 4 show schematic cross-sectional views of a first embodiment of a device 1 according to the invention and illustrate individual steps such as can be provided in various embodiments of the method 100 according to the invention. The device 1 is designed as module, which can be installed in a packaging facility 50 corresponding to the exemplary embodiment according to FIG. 1 or also in other embodiments of a packaging facility.

The device 1 comprises a frame structure 13, within which a transport module 20 and a work module 30 are completely accommodated. A mass of the transport module 20 and a mass of the work module 30 are completely born by the frame structure 13.

If sets 12 of beverage containers 14 (cf. FIG. 1) are intended to be moved along the device 1, the transport module 20 or the work module 30 can optionally be used for this purpose, depending on the particular packaging type of the package provided for the particular beverage containers 14. The transport module 20 in FIG. 2 comprises a transport device 2, which is designed as panel 23 and via which sets 12 of beverage containers 14 are movable in a sliding manner if the panel 23 is in a operating position BP (cf. FIG. 3). In FIG. 2, the transport device 2 or the panel 23 is in a waiting position WP. For the sliding movement of the sets 12 of beverage containers 14, the panel 23 provides a support surface, which is referred to in FIG. 2 with the number 26.

The work module 30 comprises a folding mechanism 45 with chain drives and/or belt drives 44, which in each instance move a multitude of folding fingers 24 in a circulating manner. In FIG. 2, the folding mechanism 45 is in a waiting position WP. If the folding mechanism 45 of the work module 30 is brought into an operating position BP, as is illustrated in FIG. 4, then the work module 30 is able to erect the flaps on flat packaging blanks 42 (cf. FIG. 1) in an upward direction by the circulatingly moved multitude of folding fingers 24, as well as it is able to move the flat packaging blanks 42 together with the beverage containers 14 standing thereon in a transport direction TR, which in FIGS. 2-5 is perpendicular to the image plane.

The work module 30 is thus suited to move the sets 12 of beverage containers 14 and, in doing so, to erect flaps of flat packaging blanks 42 or to transfer the flaps into an upright orientation.

The transport module 20 is thus suited to move sets 12 of beverage containers 14 without a corresponding outer package the flaps of which would need to be or should be erected. Sets 12 of beverage containers 14 standing on a so-called pad can thus be moved via the transport module 20. A pad can be designed as a flat packaging blank without flaps that could be transferred into an upright orientation. Such a pad can have two broadside surfaces disposed on oppositely located sides, with one broadside surface that is oriented in an upward direction being preassigned to position or to arrange sets 12 of beverage containers 14. A pad can be formed by cardboard and/or paperboard. It is also possible to move beverage containers 14 via the transport module 20 with the beverage containers 14 not standing on any flat packaging blanks or, as applicable, with the beverage containers 14 being intended to have thermoplastic packaging material shrunk onto them at a later point in time in order for the beverage containers 14 to be gathered together in a bundle.

If flat packaging blanks 42 are first moved by the device 1 with the flaps of the packaging blanks 42 being transferred into an upright orientation via the folding fingers 24, and if it is intended following temporally hereafter to move sets 12 of beverage containers 14 via the device 1, for which sets 12 of beverage containers 14 no such flat packaging blank is provided, then the transport device 2 or the panel 23 is to be transferred from the waiting position WP illustrated in FIG. 2 into an operating position BP. For this purpose, the transport module 20 comprises a joint mechanism 22, to which the transport device 2 or the panel 23 is connected. Via the joint mechanism 22, the transport device 2 or the panel 23 can be rotated about an axis pointing parallel to the transport direction TR (cf. FIG. 1) provided for the beverage containers 14, whereby the transport device 2 or the panel 23 leaves the waiting position WP illustrated in FIG. 2 and reaches the operation position BP illustrated according to FIG. 3. The rotation can be carried out manually or via an actuator, which is not illustrated in the figures of the present patent application.

In this context, FIG. 3 shows that the support surface 26, which is formed by the panel 23 having been brought into the operating position BP, has a horizontal orientation. As already described for FIG. 1, pusher bars 9 can be moved in a circulating manner via a chain drive and/or belt drive 7, with the pusher bars 9 coming into surface contact from the back with at least one beverage container 14 of a particular set 12 and pushing the particular set 12 in a sliding manner along the support surface 26 of the panel 23, which has been brought into the operating position BP.

If it is intended to move sets 12 of beverage containers 14 via the device 1 at a later point in time and to fold flaps of the packages provided for the sets 12 in an upward direction in this context, the panel 23 of the transport module 20 is swiveled back via the joint mechanism 22 from the position according to FIG. 3 into the position according to FIG. 4, that is, into the waiting position according to FIG. 4. The FIGS. 3 and 4 seen in conjunction moreover illustrate that the folding mechanism 45 is swiveled from its waiting position WP still assumed in FIG. 3 into its operating position BP according to FIG. 4 via the joint mechanism 32, in which operating position BP the folding fingers 24 of the folding mechanism 45 can erect flaps of flat packaging blanks 42 (cf. FIG. 1). Swiveling the folding mechanism 45 can also be carried out manually in various embodiments or via an actuator in various other embodiments.

In this context, it is discernible from FIGS. 2 to 4 that the folding mechanism 45 or the chain drives and/or belt drives 44 with the folding fingers 24 fastened thereto is/are disposed exclusively on the right side in relation to the transport device 2. This arrangement is maintained independently of whether the folding mechanism 45 and the transport device 2 are in a particular operating position BP or in a particular waiting position WP.

FIG. 5 shows a schematic cross-sectional view of a second embodiment of a device 1 according to the invention and illustrates individual steps such as can be provided in various embodiments of the method 100 according to the invention. The embodiment from FIG. 5 comprises a work module 30 with a folding mechanism 45, which is designed corresponding to the exemplary embodiment according to FIGS. 2 to 4, and which can be swiveled via a joint mechanism 32 from the waiting position WP shown in FIG. 5 into an operating position BP and from an operating position BP into the waiting position WP shown in FIG. 5. The device 1 furthermore comprises a transport module 20 with a transport device 2, which has assumed an operating position BP in FIG. 5. In the embodiment according to FIG. 5, the transport device 2 is designed as a circulating conveyor strand 21 of a horizontal conveying system 25. The horizontal conveying system 25 is a component of the transport module 20 and comprises a motor M, which drives the conveyor strand 21 in a circulating manner. If the transport device 2 or the horizontal conveying system 25 is to be transferred from the operating position BP according to FIG. 5 into a waiting position WP, the transport device 2 or the horizontal conveying system 25 is for this purpose swiveled in a downward direction about an axis of rotation provided by the joint mechanism 22.

Figure 6B:
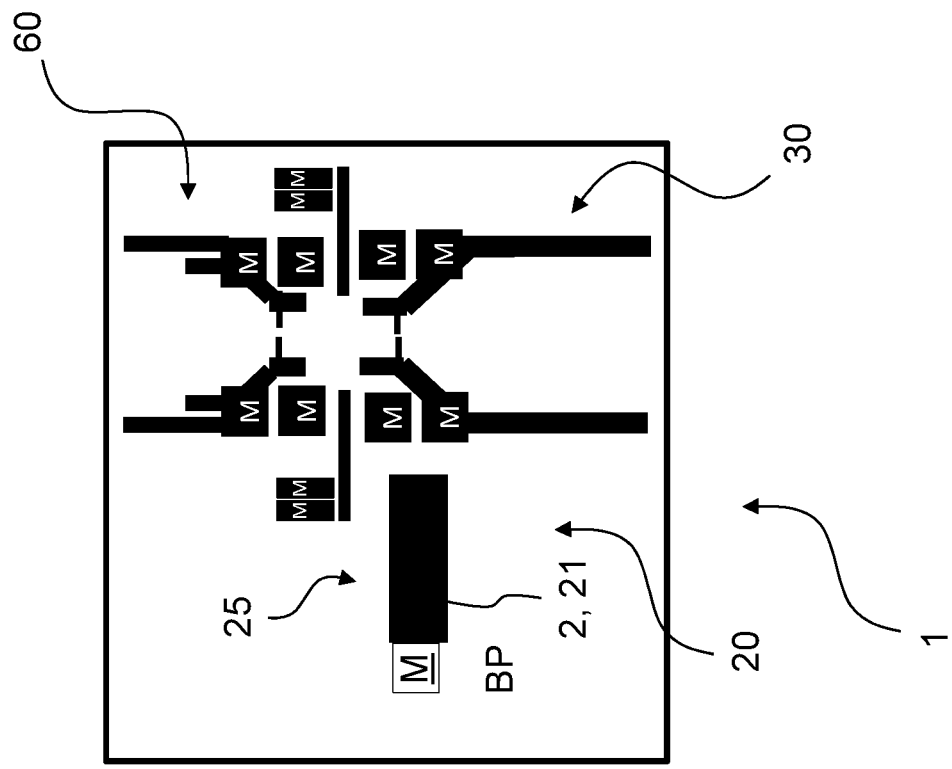
FIGS. 6a and 6b show a schematic cross-sectional view of a third embodiment of a device according to the invention and illustrate individual steps such as can be provided in various embodiments of the method according to the invention.
Figure 6A:
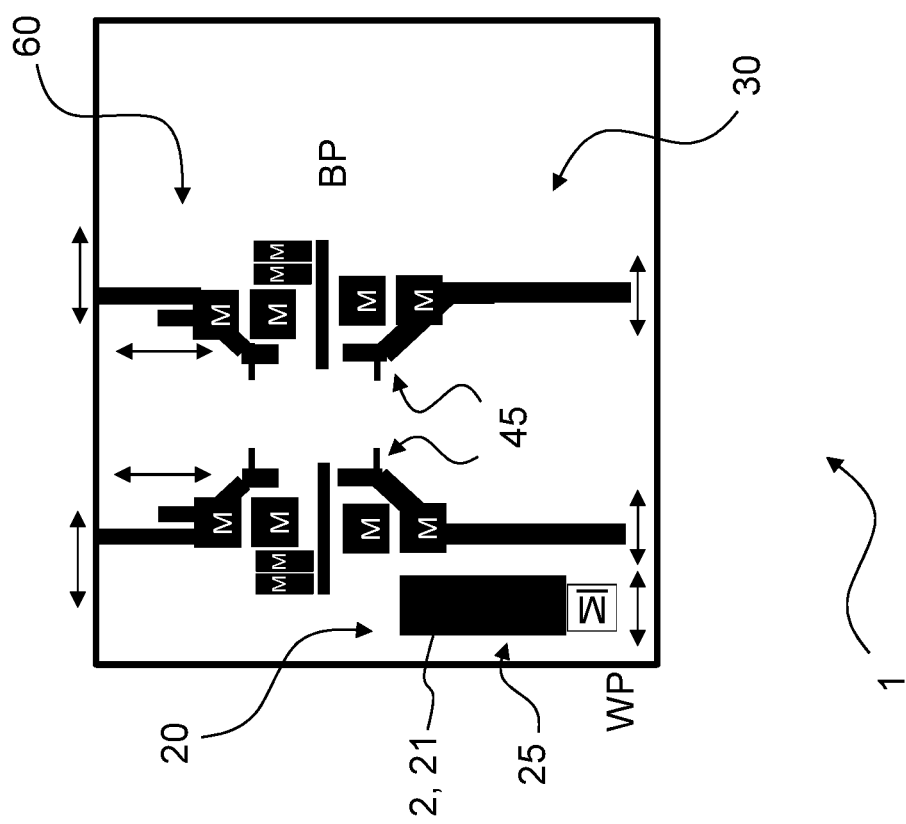

FIGS. 6a and 6b show a schematic cross-sectional view of a third embodiment of a device 1 according to the invention and illustrate individual steps such as can be provided in various embodiments of the method 100 according to the invention (cf. FIG. 8). The embodiment of a device 1 of the exemplary embodiment according to FIGS. 6a and 6b furthermore comprises a transport module 20 with a transport device 2, which is designed as a circulating conveyor strand 21 of a horizontal conveying system 25. Furthermore provided is also a work module 30 with a folding mechanism 45, which can erect flaps of flat packaging blanks 42.

In order to fold in top flaps of packaging blanks 42 and to close outer packages, the device 1 of the exemplary embodiment according to FIGS. 6a and 6b moreover has a closing mechanism 60. The closing mechanism 60 can have a plurality of chain drives and/or belt drives, which circulatingly move corresponding folding-in devices in order to close top flaps. As already mentioned above, it is possible that beverage containers 14 are moved along the horizontal conveying system 25, which is designed as component of the transport module 20, with the beverage containers 14 not standing on any flat packaging blanks 42 such that no flaps of flat packaging blanks 42 have to be folded or transferred into an upright orientation during a transport via the transport device 2.

When the folding mechanism 45 is in its operating position BP in correspondence with FIG. 6a, the closing mechanism 60 is also in its operating position BP. In the operating position BP, the folding mechanism 45 then transfers flaps of flat packaging blanks 42 into an upright orientation, while the closing mechanism 60 can then close the top flaps of the flat packaging blanks 42. If the transport device 2 has assumed its operating position BP according to FIG. 6b and beverage containers 14 are being moved without a flat packaging blank 42, the closing mechanism 60 is no longer needed for closing top flaps. In order to avoid problems during the movement of beverage containers 14 via the transport device 2 that is disposed in the operating position BP, the closing mechanism 60 is also to be transferred from the operating position BP according to FIG. 6a into the waiting position WP according to FIG. 6b. For this purpose, the closing mechanism 60 is connected to a linear guide, via which the closing mechanism 60 can be shifted in horizontal direction from its operating position BP according to FIG. 6a into the waiting position WP according to FIG. 6b.

FIGS. 6a and 6b moreover show that the closing mechanism 60 is located exclusively above the transport device 2 or above the horizontal conveying system 25 and exclusively above the folding mechanism 45. The reference character M, in addition, in each instance indicates a motor, which is assigned to the transport module 20 or to the work module 30. The motors M can be used to circulatingly move, for example, chain drives and/or belt drives 44, which are formed as components of the folding mechanism 45. The motor, which is formed as a component of the horizontal conveying system 25, is provided to circulatingly move the transport device 2, which is designed as a conveyor strand 21.

The FIGS. 6a and 6b seen in conjunction also illustrate that the transport device 2 leaves the waiting position WP according to FIG. 6a and reaches the operating position BP by a rotary movement. For this purpose, the transport device 2 or the horizontal conveying system 25 can be connected to a joint mechanism corresponding to the exemplary embodiments according to FIGS. 2 to 5. The rotary movement can be performed actuatorically or manually. It is also possible that the transport device 2 is mechanically coupled to the folding mechanism 45 such that the folding mechanism 45 pulls the transport device 2 or the horizontal conveying system 25 into its operating position BP.

FIGS. 7a and 7b show a schematic cross-sectional view of a fourth embodiment of a device 1 according to the invention and illustrate individual steps such as can be provided in various embodiments of the method 100 according to the invention. The embodiment of a device 1 from the exemplary embodiment according to FIGS. 7a and 7b furthermore comprises a transport module 20 with a transport device 2, which is designed as a circulating conveyor strand 21 of a horizontal conveying system 25. Furthermore provided is also a work module 30 with a folding mechanism 45, which can erect flaps of flat packaging blanks 42 (cf. FIG. 1). Located above the work module 30 and above the transport module 20 is a closing mechanism 60, which can fold in top flaps and thereby close a particular outer package.

The folding mechanism 45 in FIG. 7a is in its operating position BP, whereas the transport device 2 is disposed in its waiting position WP. In FIG. 7b, the folding mechanism 45 has changed its waiting position WP, with the transport device 2 having been transferred into its operating position BP by a rotary movement. The FIGS. 7a and 7b seen in conjunction also illustrate that the closing mechanism 60 has been transferred from its operating position BP according to FIG. 7a into its waiting position WP according to FIG. 7b by a vertical lifting movement. In both instances, when the transport device 2 is located in its operating position BP (cf. FIG. 7a) and when the folding mechanism 45 is located in its operating position BP (cf. FIG. 7b), the closing mechanism 60 is in each instance disposed above the transport device 2 and above the folding mechanism 45.

FIG. 8 shows a flowchart of steps such as can be provided individually or in the combination or sequence illustrated according to FIG. 8 in various embodiments of the method 100 according to the invention. The method 100 can be used for a device 1 according to one of the exemplary embodiments corresponding to FIGS. 2 to 7 or can be carried out by a device 1 according to one of the exemplary embodiments corresponding to FIGS. 2 to 7 such that the above-described exemplary embodiments are referred back to regarding the reference characters used.

In method step 110, a folding mechanism 45 of a work module 30 is brought into an operating position BP by a rotary movement, whereas a transport device 2 of a transport module 20 remains in a waiting position WP. The work module 30, together with the folding mechanism 45 still disposed in the operating position BP, then transports sets 12 of beverage containers 14 and transfers flaps of flat packaging blanks 42 into an upright orientation, with the sets 12 of beverage containers 14 standing on the flat packaging blanks 42.

Temporally after the method step 110 follows the method step 120, in which the folding mechanism 45, which up to then has been disposed in the operating position BP, is transferred into a waiting position WP by a rotary movement. In method step 120, the transport device 2 of the transport module 20, which up to then has been disposed in its waiting position WP, is moreover brought from its waiting position WP into its operating position BP by a rotary movement.

In step 130, beverage containers 14 are moved in a sliding manner along the transport device 2, which is still disposed in the operating position BP, with the beverage containers 14 in this context not standing on any flat packaging blanks 42. At a later point in time, thermoplastic packaging material, which is used to gather together a plurality of beverage containers in a bundle, is applied onto the beverage containers 14 being moved according to step 130 in a sliding manner along the transport device 2, which is still disposed in the operating position BP. During the method 100 or temporally during the steps 110 to 130, the folding mechanism 45 is disposed exclusively adjacent to the right side or to the left side in relation to the transport device 2 of the transport module 20.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

1 Device
2 Transport means
3 Infeed
4 Conveyor belt
7 Chain drive and/or belt drive
9 Pusher bar
12 Set
14 Beverage container
16 Transfer plate
20 Transport module
21 Circulating conveyor strand
22 Joint mechanism
23 Panel
24 Folding finger
25 Horizontal conveying system
26 Support surface
30 Work module
32 Joint mechanism
40 Supply
42 Flat packaging blank
44 Chain drive and/or belt drive
45 Folding mechanism
50 Packaging facility
60 Closing mechanism
62 Outfeed belt
70 Wrapping module
72 Chain drive and/or belt drive
74 Wrapping rod
100 Method
110 First method step
120 Second method step
130 Third method step
BP Operating position
M Motor
TR Transport direction
WP Waiting position

The invention claimed is:

1. A device (1) used to handle articles to be packaged comprising:
at least one work module (30), which can move packages of articles placed onto a first packaging type, and which has at least one folding mechanism (45) used to erect back or front flaps, which are formed by the packages of the first packaging type, and
at least one transport module (20), which comprises a transport device (2) or a panel (23), along which articles intended for packages of a second packaging type are movable, which second packaging type differs from the first packaging type,
wherein the at least one folding mechanism (45) and the at least one transport module (20) are movable between an operating position (BP) and a waiting position (WP), such that either the at least one folding mechanism (45) or the at least one transport module (20) is located in its operating position (BP), and
wherein the at least one folding mechanism (45) or the at least one transport module (20) are swivelable between its operating position (BP) and its waiting position (WP).

2. The device of claim 1, wherein
the panel (23) comprises a support surface (26), along which support surface (26) articles intended for packages of the second packaging type can be slidingly moved, or
the transport device (2) is designed as circulatingly driven component of a horizontal conveying system (25).

3. The device of claim 2,
wherein the at least one transport module (20) is connected to a joint mechanism (22) having an axis of rotation, via which the at least one transport module (20) is swivelable from its operating position (BP) into its waiting position and from its waiting position (WP) into its operating position (BP), or
wherein the at least one folding mechanism (45) is connected to a joint mechanism (32) having an axis of rotation, via which the at least one folding mechanism (45) is swivelable from its operating position (BP) into its waiting position (WP) and from its waiting position (WP) into its operating position (BP).

4. The device of claim 3,
wherein the transport device (2) is connected to a joint mechanism (22) having a first axis of rotation, via which the transport device (2) is swivelable from its operating position (BP) into its waiting position (WP) and from its waiting position (WP) into its operating position (BP), and
wherein the at least one folding mechanism (45) is connected to a joint mechanism (32) having a second axis of rotation, via which the at least one folding mechanism (45) is swivelable from its operating position (BP) into its waiting position (WP) and from its waiting position (WP) into its operating position (BP), and
wherein the first axis of rotation and the second axis of rotation are disposed spaced apart from each other.

5. The device of claim 4, wherein the first axis of rotation and the second axis of rotation are parallel to each other.

6. The device of claim 1,
wherein the at least one work module (30) comprises a linear guide, via which the at least one folding mechanism (45) is movable in horizontal direction from its operating position (BP) into its waiting position (WP) and from its waiting position (WP) into its operating position (BP), or
wherein the at least one transport module (20) comprises a linear guide, via which the transport device (2) is movable in horizontal direction from its operating position (BP) into its waiting position (WP) and from its waiting position (WP) into its operating position (BP).

7. The device of claim 1, wherein the transport module (20) is mechanically coupled to the at least one folding mechanism (45) such that the transport module (20) is moved along together with the at least one folding mechanism (45) in a movement of the at least one folding mechanism (45) from its operating position (BP) into its waiting position (WP) and from its waiting position (WP) into its operating position (BP).

8. The device of claim 7, further comprising:
at least one closing mechanism (60) used to fold top flaps, which top flaps are formed by the packages of the first packaging type, wherein the at least one closing mechanism (60) is movable between an operating position (BP) and a waiting position (WP), such that the at least one closing mechanism (60) and the at least one folding mechanism (45) can assume each of their operating positions (BP) together and each of their waiting positions (WP) together, and
wherein the operating positions (BP) and the waiting positions (WP) of the at least one folding mechanism (45) and of the transport module (20) are configured such that the at least one closing mechanism (60) is disposed exclusively above the at least one folding mechanism (45) and exclusively above the transport module (20).

9. A method (100) used to adapt a device (1) for the transport of articles comprising:
alternately moving at least one folding mechanism (45) of at least one work module (30) and a transport device (2) or a panel (23) of at least on transport module (20) between an operating position (BP) and a waiting position (WP), such that either the at least one folding mechanism (45) or the transport device (2) is located in its operating position,
wherein the movement of the at least one folding mechanism (45) or the at least one transport module (20) is a swivel movement between its operating position (BP) and its waiting position (WP),
wherein at least one work module (30) can move packages of articles placed onto a first packaging type, and wherein the at least one folding mechanism (45) is used to erect back or front flaps, which back or front flaps form the first packaging type, and
wherein the at least one transport module (20) can move packages of articles of a second packaging type, which second packaging type differs from the first packaging type.

10. The method of claim 9, further comprising:
circulatingly driving the transport device (2) in the operating position (BP) and moving articles intended for packages of a second packaging type, or
slidingly moving articles intended for packages of a second packaging type along the transport device (2) or panel (23) in the operating position (BP).

11. The method claim 10, comprising:
moving, via swiveling at a joint mechanism (22), the transport module (20) into its operating position (BP) and back from its operating position (BP) into its waiting position (WP), or
moving, via swiveling at a joint mechanism (32), the at least one folding mechanism (45) into its operating position (BP) and back from its operating position (BP) into its waiting position (WP).

12. The method of claim 11, further comprising:
moving, via a linear guide, the at least one folding mechanism (45) in horizontal direction from its operating position (BP) into its waiting position (WP) and from its waiting position (WP) into its operating position (BP), or
moving, via a linear guide, the transport device (2) in horizontal direction from its operating position (BP) into its waiting position (WP) and from its waiting position (WP) into its operating position (BP).

13. The method claim 9, comprising:
moving, via swiveling at a joint mechanism (22), the transport module (20) into its operating position (BP) and back from its operating position (BP) into its waiting position (WP), or
moving, via swiveling at a joint mechanism (32), the at least one folding mechanism (45) into its operating position (BP) and back from its operating position (BP) into its waiting position (WP).

14. The method of claim 13, further comprising:
moving, via a linear guide, the at least one folding mechanism (45) in horizontal direction from its operating position (BP) into its waiting position (WP) and from its waiting position (WP) into its operating position (BP), or
moving, via a linear guide, the transport device (2) in horizontal direction from its operating position (BP) into its waiting position (WP) and from its waiting position (WP) into its operating position (BP).

15. The method of claim 9, further comprising:
alternatingly moving at least one closing mechanism (60) of the at least one work module (30) between an operating position (BP) and a waiting position (WP), such that the at least one closing mechanism (60) and the at least one folding mechanism (45) assume their operating positions (BP) simultaneously and their waiting positions (WP) simultaneously, and wherein the alternating movement is carried out in a manner that, temporally during and after a completion of the movement, the at least one closing mechanism (60) is located exclusively above the transport module (20) and exclusively above the at least one folding mechanism (45).

\* \* \* \* \*